June 7, 1955     H. E. GRIMES     2,709,932
MACHINE TOOL
Filed July 28, 1952     9 Sheets-Sheet 1

INVENTOR.
HARLAN E. GRIMES
BY Joseph A. Rave
Attorney

June 7, 1955  H. E. GRIMES  2,709,932
MACHINE TOOL

Filed July 28, 1952  9 Sheets-Sheet 4

INVENTOR.
HARLAN E GRIMES
BY
Joseph A. Rave
Attorney

June 7, 1955  H. E. GRIMES  2,709,932
MACHINE TOOL

Filed July 28, 1952  9 Sheets-Sheet 5

INVENTOR.
HARLAN E GRIMES
BY
Joseph A. Rave
Attorney

June 7, 1955  H. E. GRIMES  2,709,932
MACHINE TOOL

Filed July 28, 1952  9 Sheets-Sheet 6

INVENTOR.
HARLAN E. GRIMES
BY
Joseph A. Rave
Attorney

INVENTOR.
HARLAN E. GRIMES
BY Joseph A. Rave
Attorney

United States Patent Office 2,709,932
Patented June 7, 1955

2,709,932

MACHINE TOOL

Harlan E. Grimes, Bromley, Ky., assignor to The Avey Drilling Machine Company, Covington, Ky., a corporation of Ohio Application July 28, 1952, Serial No. 301,198

19 Claims. (Cl. 77—64)

This invention relates to improvements in machine tools and particularly to improvements in an indexing mechanism for machine tools.

A machine tool incorporating a work supporting table or a tool supporting mechanism, intermittently, indexable from station to station is not, per se, new. In the past, however, complicated and involved mechanism was the order with the ultimate desire for accuracy with the result that the complicated mechanism defeated its own purpose. In the past, the number of indexes, or the number of stations to which the mechanism could be operated, in a given cycle, was extremely limited and was further limited to a particular, relatively small, number of cycles, that is, each index angular displacement was equal to all other indexes angular displacement except that a special and a completely redesigned machine were provided.

By the present invention there is provided a machine tool including an indexable mechanism, for a work supporting table, tool supporting mechanism, or the like, that includes a minimum number of elements or parts yet accomplishes the desired function within extremely fine limits of accuracy. By the present invention the number of indexes or stations is extremely wide and depends exclusively on the size of the tool being employed or the size of the part being operated upon. For example, an accepted standard of table, 30 inches in diameter, for example, can be arranged within the limits of the machine for indexing to stations from two to one hundred in number. Furthermore each of the stations may have a different amount of angular displacement or distance therebetween or the said displacement may be equal throughout the cycle as is customary. The cycle, insofar as the number of stations therein or the angular displacement thereof, may be readily changed by merely substituting a simple mechanism in the same manner as change gears are employed for obtaining variations in spindle, shaft, lead screws, and the like, insofar as their revolutions per minute is concerned.

By the present invention an indexable table may be equipped for several different cycles requiring merely a simple adjustment of the cycle cooperating means for changing the indexable cycle, wherefore, successive work pieces may be operated upon whose cycles of operations differ from one another in that, for example, the holes therein are differently spaced. By this construction there is provided a single machine tool wherein small lots of several parts may be automatically machined in succession thereby making, what is normally, a special machine as economical to a user a machine which is no more expensive to obtain, maintain and use than a utility machine tool.

It is, therefore, the principal object of the present invention to provide an indexable mechanism that is simple of construction and economical to acquire and use.

Another object of this invention is the provision of an indexing mechanism that can be readily adapted to an extremely wide range of index cycles simply by changing an index cycle control part.

A further object of this invention is the provision of an electrically operated indexing mechanism that is extremely accurate in stopping the movable part, yet, in which the mechanism is rapid in operation between stations.

A further object of this invention is the provision of an indexing mechanism in a machine tool organization that may be automatically operated or manually operated, selectively or by design.

Other objects and advantages of the present invention should be readily apparent by reference to the following specification considered in conjunction with the accompanying drawings forming a part thereof and it is to be understood that any modifications may be made in the exact structural details there shown and described, within the scope of the appended claims, without departing from or exceeding the spirit of the invention.

In the drawings.

Throughout the several views of the drawings similar reference characters are employed to denote the same or similar parts.

The invention is illustrated in the drawings in connection with a drilling unit to provide an automatic drilling machine but it is to be understood that the indexing mechanism may be employed with other types of tools.

Specifically and as illustrated in the drawings use is made of a supporting bed 25 on the upper end of which is mounted a support 26 for a rotatable table 27. The support 26 in addition, as will presently be made clear, carries the mechanism for rotating the table 27. Laterally and preferably, though not necessarily, of the bed 25 is a table drive motor suitably enclosed by a housing 28 having a displaceable plate 29 whereby access to the motor may be obtained for lubricating purposes, manual adjustment and the like. Laterally of the bed 25 and preferably angularly displaced from the motor housing 28 is a pedestal, tank housing, or the like 30 which may conveniently be in the form of a tank for lubricant, coolant, and the like. The pedestal or housing 30, in addition, is utilized to support the tooling unit, which, as illustrated in the drawings and intimated above, is a self contained drilling unit 31. This drill unit 31 is a cam feed unit, that is, a unit in which a cam is employed for advancing and retracting the drill 32. Disposed on the work supporting table 27 is a work piece in the form of a ring 33 having a plurality of spaced holes 34 each of which is formed by the drill 32. In addition the housing 25 supports either directly or through some appendage thereof, illustrated in the drawings as the pedestal or housing 30, panel 35 which, in effect, is a shallow cabinet to house the electric control elements for the table drive motor and the drilling unit, as will presently be described in detail.

As illustrated in the drawings the bed 25 is of welded construction including a vertical wall 36 having an opening at one point thereof normally closed by a door 37 and through which opening access to the interior of the bed may be had. The bed vertical wall 36 is formed, in the main, as circular and is provided, downwardly of its upper end to project inwardly, with a ledge 38 to which is secured the table support bed plate 39. The table support 26 is provided at its lower end with an outwardly projecting radial flange 40 through which it is bolted or otherwise secured to the table support bed plate 39.

The table support 26 is provided with a central sleeve 41 suitably bored to receive anti-friction bearings 42 and 43 centrally of which is the table bearing spindle 44. The table bearing spindle 44 centrally depends from the table 27 and has securely attached thereto the inner races 45 of the anti-friction bearings 42 and 43. Any suitable or desirable means may be employed for securing the said anti-friction bearings inner races 45 to the table spindle, that shown in the drawings also effecting a preloading of the said anti-friction bearings. The said means comprises a pre-loading plate 46 secured through screws 47 to the lower end of the table spindle for forcing said inner races 45 upwardly, axially of the table spindle 44 toward the table itself and forcing the upper race 45 against a thrust bearing or washer 48 located between the said upper anti-friction bearing 42 and the undersurface of the table proper. The outer races 49 of the said anti-frictions bearings 42 and 43 each have a radial shoulder respectively flanking the upper and lower surfaces of the table support sleeve 41 and which resist the movement of the inner races in effecting the pre-loading of the bearings.

The lower end of the table spindle assembly is closed by a cup-shaped cap 50 which, through a radical flange 51, is secured by screws 52 to the lower end of the table support sleeve 41. Any suitable or desirable seal may be incorporated with the cup-shaped cap or closure member 50 for preventing loss of grease and lubricant from around the table spindle 44 and the bearings 42 and 43.

Figure 3:
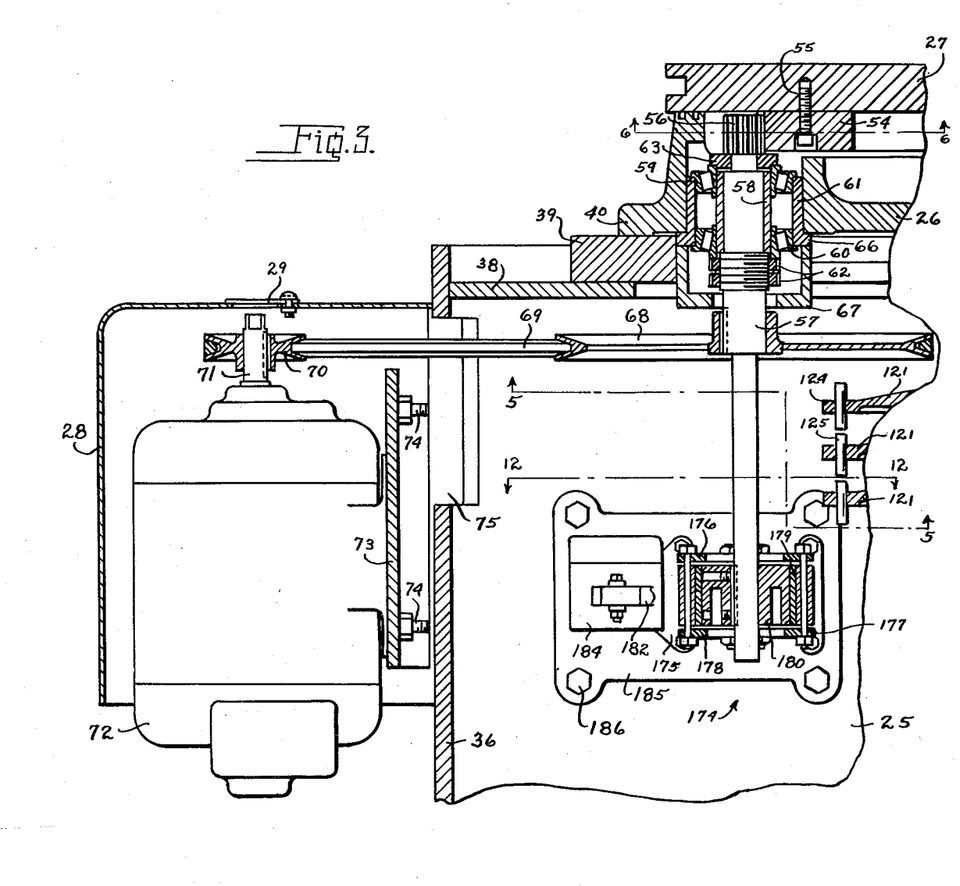
Fig. 3 is an enlarged fragmentary sectional view through the drive mechanism to the work supporting table as seen from line 3—3 on Fig. 2.

The outer perimeter of the work supporting table 47 is supported by an upwardly projecting rim or flange 53 of the table support 26, with said table being rotated by or through any suitable or desirable medium. As shown in the drawings the table 27 has secured to its undersurface, just inwardly of the table supporting flange 53, a ring gear 54 secured in position by suitable pins and screws 55. The ring gear 54 has meshed therewith a driving pinion 56 at the upper end of a driving shaft 57. The driving shaft 57, see particularly Fig. 3, is mounted in a bushing 58 in turn disposed within the inner races of anti-friction bearings 59 and 60 carried by an outer sleeve 61. The anti-friction bearings 59 and 60 are pre-loaded on the drive shaft 57 and in the bushing 58 by suitable nuts 62 threaded on the said drive shaft 57 for securing said anti-friction bearings between the said nuts 62 and a split washer 63 abutting on its upper surface with the lower surface of the driving pinion 56. This assembly is secured in a suitable opening in the table support 26 by means of screws 64 and 65 which extend through a radial flange 66, on the sleeve 61, into the said table support 26 around the opening, see Fig. 5. The lower end of the driving shaft and pinion assembly is closed by a cup-shaped cap 67 secured to the lower surface of the sleeve flange 66 by the screws 65.

Secured to the driving shaft 57 below the cup-shaped cap 67 is a pulley 68 illustrated as of the V belt type around which is trained a V belt 69. The V belt 69 in turn extends around a pulley 70 keyed or otherwise secured to the shaft 71 of a motor 72, as noted above disposed to one side of the bed 25 and within the housing 28.

The motor 72 is bolted or otherwise secured to a mounting plate 73 which in turn is secured by means of tie rods 74 to the exterior surface of the bed wall 36. A suitable opening 75 is formed through the bed wall to permit the passage of the V belt 69.

From the foregoing it will be noted that rotation of the motor 72 through the V belt 69 will rotate the drive shaft 57 which in turn through the pinion 56 and ring gear 54 will effect rotation of the work supporting table 27. The axis of rotation of the work supporting table 27 being accurately determined by its spindle 44 and the mounting therefor.

The motor 72 is of such a type that it may be rotated at different speeds and in reverse directions. The different speeds of the motor being desirable for rapidly advancing the table between index stations and slowly advancing the table when in proximity of an index station and reversible for the accurate positioning of the table. The motor illustrated in the drawings and to be described in this specification is a direct current motor, but it is to be understood that an alternating current motor may likewise be employed. As noted above the actuation or energization of the motor may be tied in with the operation of the work machining tool or the said motor may be manually operated at the commencement of each index movement. The manual operation of the motor is illustrated in Fig. 17 and will now be described; the several control switches and other mechanism utilized in effecting or controlling the table indexing will be described as they appear in effecting one complete cycle of index operation and with reference to the structural views.

Figure 17:
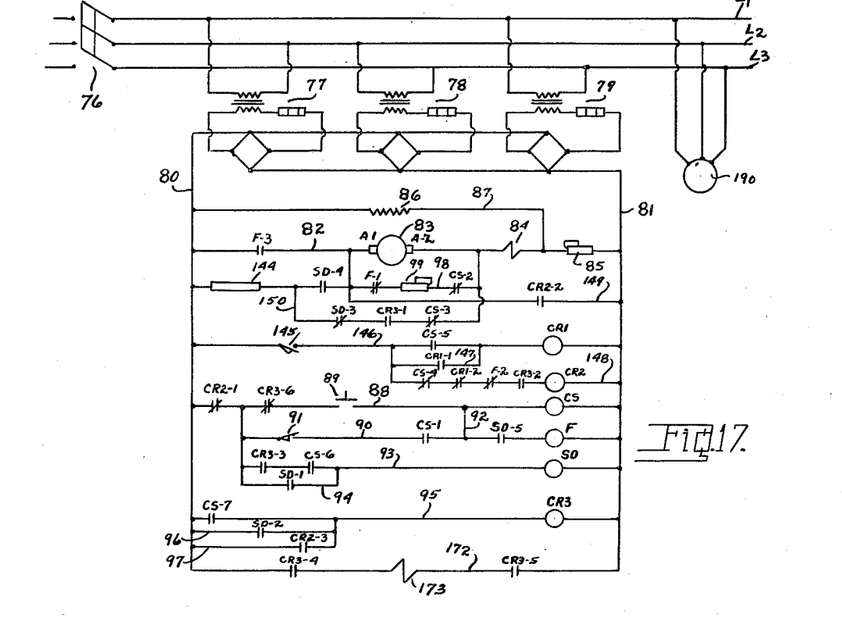
Fig. 17 is a view similar to Fig. 16 except that the indexing of the indexable part is initiated manually prior to each indexing of the part.

As shown in Fig. 17 use is made of a three phase alternating current supply including wires L1, L2 and L3 in which is a power cut off switch 76. The direct current for operating the table motor 72 is obtained from a series of units with each unit including a fused transformer and rectifier with said units indicated at 77, 78 and 79 and which units are respectively connected across wires L1 and L2, L2 and L3, and L1 and L3 for simultaneously supplying direct current to primary lines or wires 80 and 81. Connected across the said primary direct current wires 80 and 81 through a wire 82 is the armature 83 of table drive motor 72. Disposed in said line or wire 82 are normally open solenoid switch contacts F-3, motor series field 84 and adjustable reverse voltage resistance 85. Shunted across the armature 83 is the shunt field 86 disposed in a line or wire 87 that extends from the primary wire 80 to a point in the line or wire 82 intermediate the motor series field 84 and reverse voltage resistance 85.

Extending between the direct current primary lines or wires 80 and 81 is a second wire or line 88 including normally closed solenoid switch contacts CR2-1, normally closed solenoid switch contacts CR3-6 cycle start or manual control switch 89 and the coil of solenoid switch CS. Extending from a point in the line or wire 88 between the normally closed solenoid switch contacts CR2-1 and solenoid switch contacts CR3-6 is a line or wire 90 that includes a normally closed switch 91, which may be variously designated as a slow down switch or an anticipating switch and presently to be described in detail. In addition the shunt wire or line 90 includes normally open solenoid switch contact CS-1, normally open solenoid switch contacts SD-5 and the coil of solenoid switch F with said line or wire 90 terminating in direct current primary line or wire 81. The wire or line 90 is strapped to or connected by a wire 92 with the line or wire 88 between a point located in the wire 88 between the cycle start switch 89 and solenoid switch coil CS and a point in the wire 90 between the normally open solenoid switch contacts CS-1 and normally open solenoid switch contacts SD-5. A second line or wire 93 extends from the point in the line or wire 88 between the solenoid switch contacts CR2-1 and solenoid switch contacts CR3-6 to the direct current primary wire or line 81 and includes normally open solenoid switch contacts CR3-3, normally open solenoid switch contacts CS-6 and the coil of solenoid switch SD. Shunted around the normally open solenoid switch contacts CR3-3 and the normally open solenoid switch contacts CS-6 is a wire 94 which contains normally open solenoid contacts SD-1.

Extending between the direct current primary wires or lines 80 and 81 is a third wire or line 95 including normally open solenoid switch contacts CS-7 as well as the coil of solenoid switch CR3. Shunted around the normally open solenoid switch contacts CS-7 is a wire 96 containing normally open solenoid switch contacts SD-2 while a second wire 97 is shunted around the said normally open solenoid switch contacts CS-7 and includes normally open solenoid switch contacts CR2-3.

With this much of the circuit the motor armature 83 can be rotated as follows:

Closing the cycle start switch 89 completes an electrical circuit from one side of the direct current source through the wire 80, normally closed solenoid switch contacts CR2-1, normally closed solenoid switch contacts CR3-6, start cycle switch 89 and coil of solenoid switch CS to the line or wire 81 and the other side of the direct current source. The energization of the solenoid switch coil CS closed the normally open solenoid switch contacts CS-1 and thereby established a holding circuit for the said solenoid switch coil CS from the wire or line 80 and one side of the direct current source through the normally closed solenoid switch contacts CR2-1, normally closed slow down or anticipating switch 91, strap 92 and solenoid switch coil CS to the wire 81 and other side of the direct current source. The energization of the solenoid switch coil CS closed normally open solenoid switch contacts CS-7 for completing the circuit through the wire or line 95 to energize the coil of solenoid switch CR3.

The energization of the solenoid switch coil CR3 opens the normally closed solenoid contacts CR3-6 for rendering inoperative the cycle start switch 89 but without disrupting the circuit to the solenoid switch coil CS since this coil is held energized by the holding circuit that includes normally open now closed solenoid switch contacts CS-1 as above set forth. The energization of the solenoid switch coil CS and the solenoid switch coil CR3 closed normally open solenoid switch contacts CR3-3 and normally open solenoid switch contacts CS-6 thereby completing a circuit in the line or wire 93 from the direct current primary wire 80 and one side of the direct current source through normally closed solenoid switch contacts CR2-1, normally open now closed solenoid switch contacts CR3-3, normally open now closed solenoid switch contacts CS-6 and the coil of solenoid switch SD for energizing said solenoid switch SD, the circuit being completed through the direct current wire 81 to the other side of the direct current source.

The energization of the solenoid SD closed the normally open solenoid switch contacts SD-1 for establishing a holding circuit for said solenoid and at the same time closed the normally open solenoid switch contacts SD-5 for completing the electric circuit through line or wire 88 and line or wire 90 beyond the strap 92 for energizing the motor starting solenoid switch F. This circuit is from one side of the direct current source through the circuit primary wire 80, normally closed solenoid contacts CR2-1, normally closed slow down or anticipating switch 91, normally open now closed solenoid switch contacts CS1, normally open now closed solenoid switch contacts SD-5, solenoid coil F and circuit primary wire or line 81 to the other side of the direct current source.

Shunted around the motor armature 83 from a point intermediate normally open solenoid switch contacts F-3 and motor armature contact A-1 in line or wire 82 is a wire 98 which includes normally closed solenoid switch contacts F-1, motor slow down and dynamic braking resistance 99 and normally closed solenoid switch contacts CS-2 with said line or wire 98 terminating in the aforesaid line or wire 82 at a point intermediate the motor armature contact A-2 and motor series field 84.

Figures 1, 2:
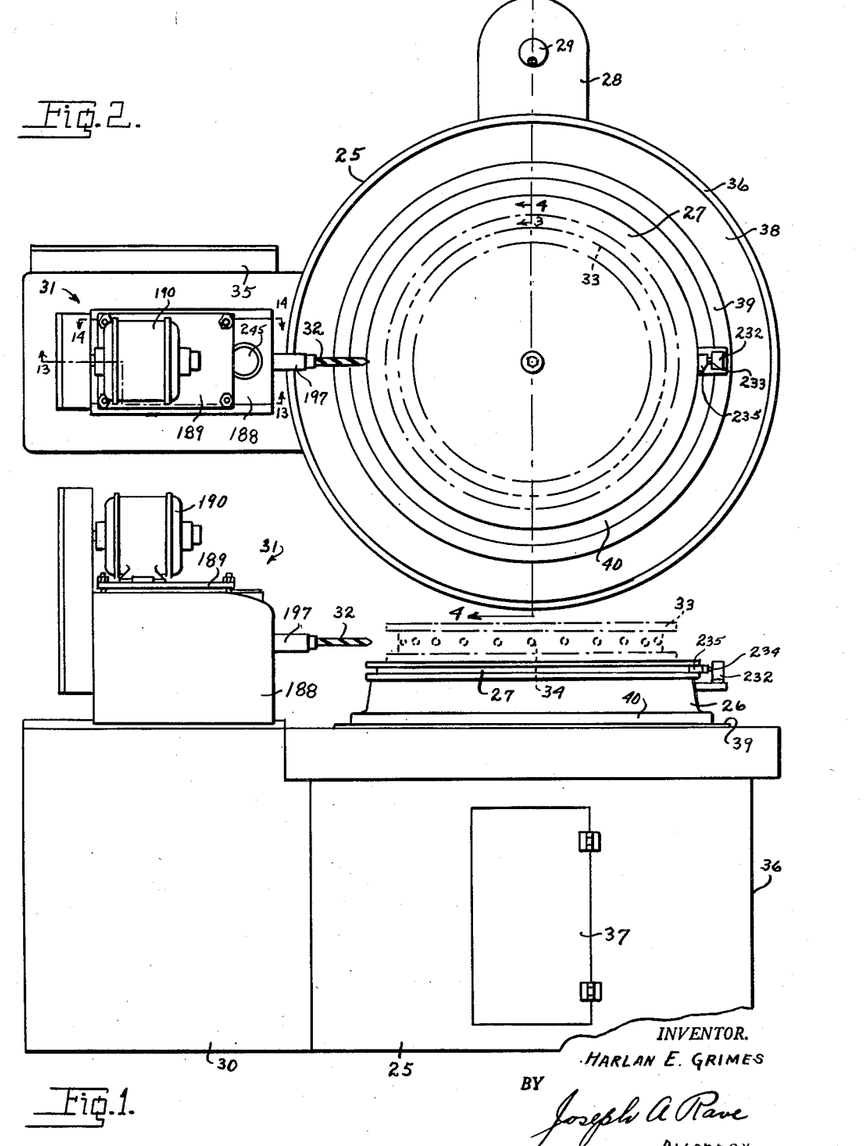
Fig. 1 is a front elevation of a machine tool embodying the improvements of the present invention.
Fig. 2 is a top plan view of the machine illustrated in Fig. 1.

The energization of the motor forward solenoid switch coil F opened the normally closed solenoid switch contacts F-1 and closed normally open solenoid contacts F-3 for thereby interrupting the dynamic brake circuit and applying the full voltage to the motor armature 83 and effecting its rotation at a rapid rate in a forward direction. The table actuating motor 72 actuates the table 27 in a clockwise direction, as seen in Fig. 2, until just before the next index station is reached whereupon the table movement is slowed down until the table is finally positioned. This slowing down of the table movement is effected by the opening of the slow down or anticipating switch 91.

Figure 4:
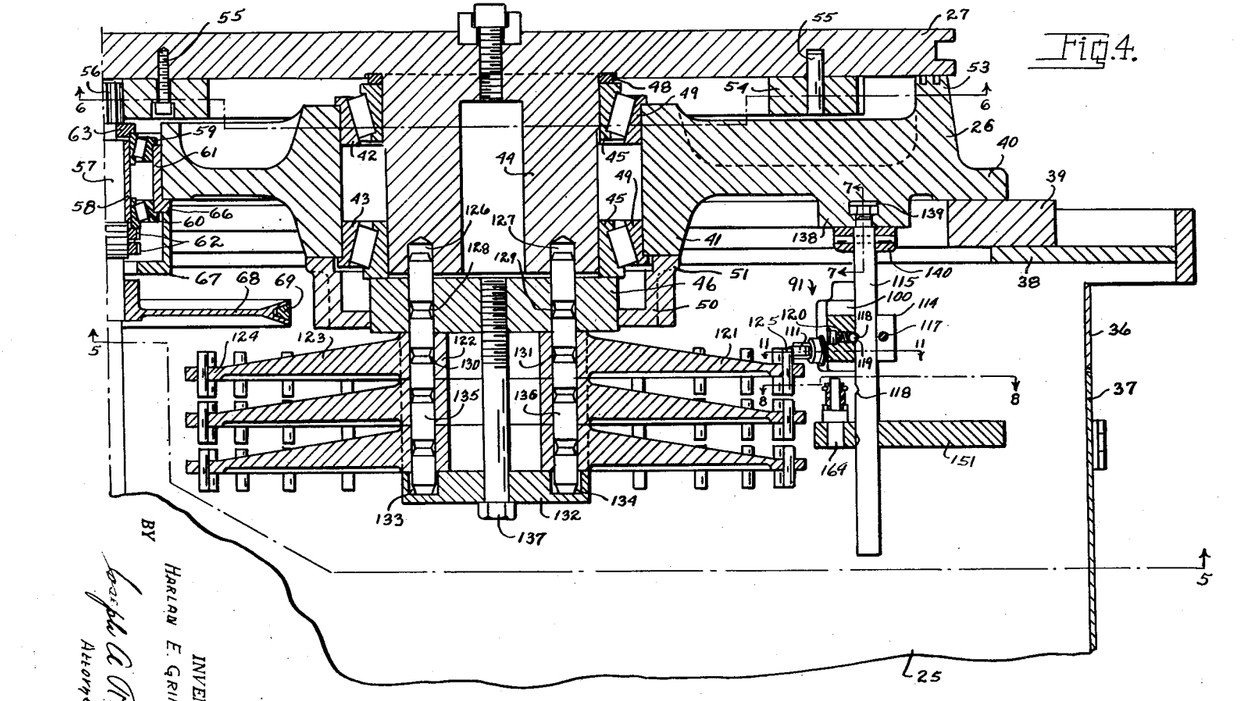
Fig. 4 is an enlarged fragmentary sectional view through the table being, in effect, a continuation of Fig. 3 as a sectional view entirely transversely of the machine and as seen from line 4—4 on Fig. 2.
Figures 5, 18:
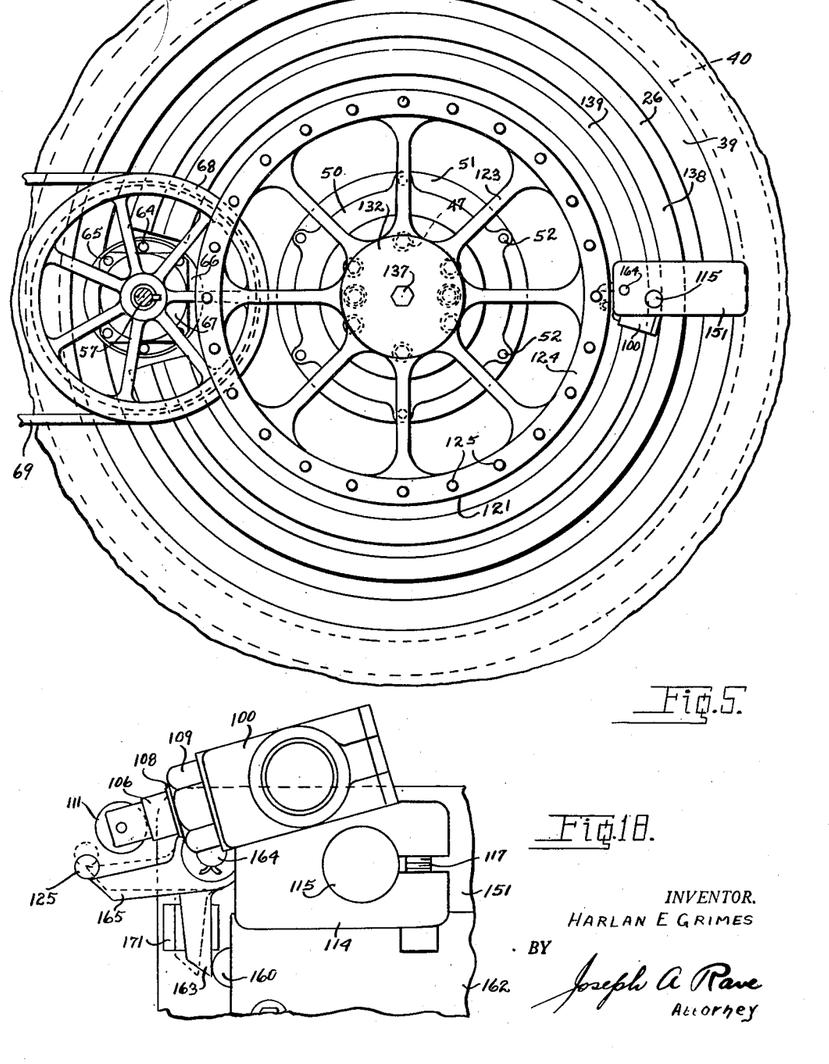
Fig. 5 is a bottom plan view of the table drive and control mechanism on a scale slightly smaller than that of Figs. 3 and 4 and as seen from line 5—5 on said Figs. 3 and 4.
Fig. 18 is a view of the index control mechanism for the slow down switch.
Figure 6:
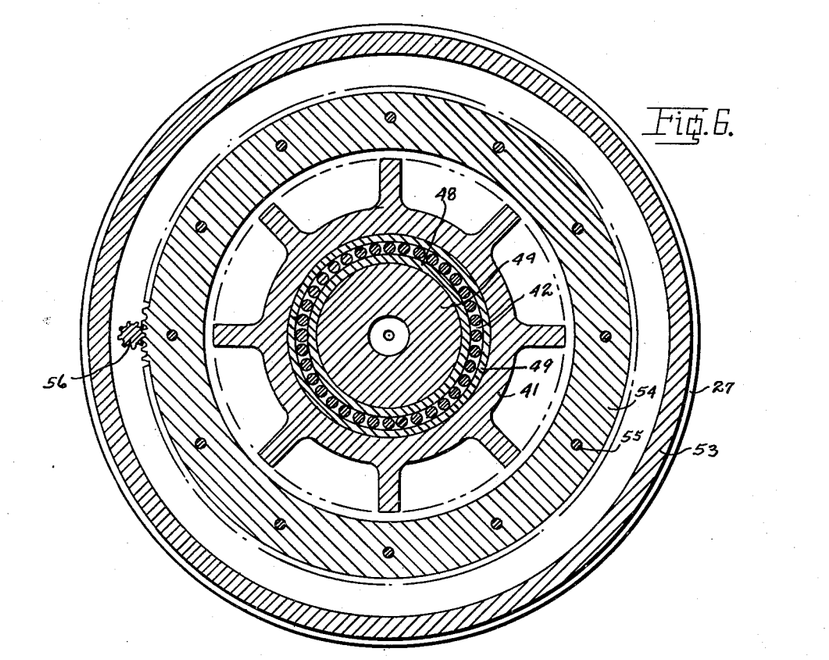
Fig. 6 is a sectional view through the table drive mechanism and mounting to the scale of Fig. 5 and as seen from lines 6—6 on Figs. 3 and 4.
Figure 11:
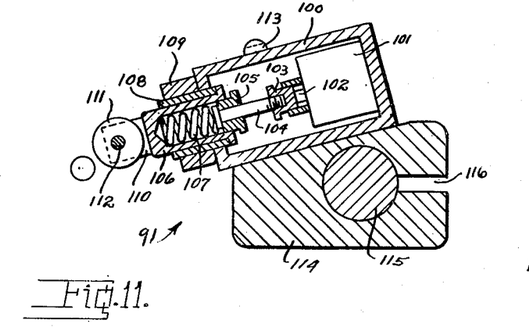
Fig. 11 is a sectional view through a second control switch on an enlarged scale as seen from line 11—11 on Fig. 4.

The slow down or anticipating switch 91 is shown structurally and with relation to the other parts of the machine in Figs. 4, 5 and 11 and is indicated in its entirety by the reference numeral 91.

As shown in Fig. 11 the said switch 91 comprises a housing 100 interiorly of which is secured the switch, per se, indicated by the reference numeral 101. This switch 101 is a commercial product sold under the trademark "Micro" and is well known in industry as a sensitive limiting switch. These switches are either of the normally closed or normally open type each for operation to its opposite position. Since a "Micro" switch is well known it is deemed unnecessary to further illustrate or describe the same.

As illustrated in the drawing the switch 101 is in its closed position and includes a depressible button 102 located immediately beneath a plunger head 103 on the inner end of a plunger rod 104. The switch 101 has incorporated therewith a spring to maintain the button 102 in the position shown and for maintaining the plunger mechanism through the head 103 in the position shown. The plunger rod 104 is disposed in a guide bushing 105 threaded or otherwise secured in one end of a hollow sleeve 106. The sleeve 106 has its other end closed with said sleeve housing a spring 107 which maintains the plunger rod 104 in the position shown in contact with the switch button 102. The sleeve 106 is axially slidable in a bushing 108 adjustably threaded through the front wall of the housing 101 and in addition has threaded thereon a jam or lock nut 109 for securing the bushing 108 in its various positions of adjustment. The outer end of the sleeve 106 is furcated, as at 110, and receives between its arms a contact roller 111 rotatable about a pin 112 carried by the arms 110.

It should be noted that the parts carried by the sleeve 106 together form a plunger which is depressible for actuating the switch button 102 with said parts adjustable to normally maintain the positions illustrated in Fig. 11.

The switch housing 101 is secured by any suitable or desirable means, such as screws 113, to a block 114 adapted, in turn, to be mounted on a stem or rod 115 depending from the table support 26, see Fig. 4. Any suitable or desirable means may be employed for securing the block 114 to the stem or rod 115, that shown in the drawings comprising slitting the said block, as at 116, to one side of the aperture therein and then forcing the portions of the block on each side of the slit toward one another by a clamp screw 117.

The slow down or anticipating switch 91 is operated by an indexing control mechanism carried by the rotatable table 27 and since, as will later be made clear, several indexing control devices may be employed the said block 114 and the stem or rod 115 are provided with locating mechanism for positioning the switch with respect to the several indexing control mechanisms. As illustrated in the drawings, Fig. 4, particularly, the post or stem 115 is provided with indentations or notches 118 receiving a spring pressed detent or ball 119 carried by the said block 114 and suitably yieldably actuated by the spring 120.

The indexing control mechanism for actuating the slow down switch 91, particularly its plunger mechanism, comprises a disc or spider 121, seen in cross section in Fig. 4 and in plan in Fig. 5. The disc or spider 121 comprises a hub 122 from which radiates a plurality of arms 123 having their outer ends joined by and together supporting a rim or ring 124. The rim or ring 124 is provided with a series of angularly spaced pins 125.

Any number of pins 125 may be carried by the spider rim. In practice the spacing of the pins has been such that the table has indexed accurately between two positions 180° apart as well as to one hundred (100) positions for each complete single revolution of the table. The drawing, purely for purposes of disclosure, illustrates a 24 position index control mechanism with each index station equally spaced from the adjacent stations. It is to be understood, however, that these stations may be increased or decreased in numbers and may be angularly spaced from one another different amounts wherefore there need not be an equal space between any two or more adjacent stations. In other words the index control pins 125 may be positioned with respect to one another around the spider rim 124 the exact angular displacement and amount that operations are to be performed on a work piece mounted on the work table 27.

The index control spider 121, as noted above, moves with the table 27 and any suitable or desirable means may be employed for connecting these parts to one another, that shown in the drawings being such that two or more index control spiders may be simultaneously mounted in position. As shown in the drawings the table spindle 44 is provided at diametrically opposite points with sockets 126 and 127 each in alignment with an aperture 128 and 129 through the table anti-friction bearing pre-loading plate 46, which are, in turn, in alignment with apertures 130 and 131 through the spider hub 122. It is to be understood that when two or more spiders 121 are used they are each provided with the apertures 130 and 131 in alignment with one another. Below the spider or spiders is a clamp plate 132 having sockets 133 and 134 formed therein respectively in alignment with the spider apertures 130 and 131. A series of dowel pins 135 is disposed in the aligned table spindle socket 126, bearing pre-loading ring aperture 128, spider or spiders aperture 130 and clamp plate socket 133 while a second series of dowel pins 136 is disposed in the other table spindle socket 127, anti-friction pre-loading plate aperture 129, spider aperture 131 and clamp plate socket 134. The dowel pins 135 and 136 are of a length as to be partly received in each superimposed part and act as keys between the parts. These parts are secured in an assembled operating unit by a central clamp bolt 137 extending through a central aperture in the clamp plate 132 and threaded into a threaded aperture substantially centrally of the anti-friction pre-loading plate 46.

From the foregoing it will be noted that if it is desired to have but a single indexing control spider 121 mounted on the table 27 the lower spiders together with their dowel pins may be removed and the clamp plate 132 elevated to engage the lower surface of the uppermost spider whereupon a single index control mechanism is in operation. It is also evident that if it is desired to have two indexing control spiders the lowermost spider together with a single pair of dowel pins may be removed and the others secured in position. By the same token if it were desired to add additional indexing control spiders they can be mounted below those shown in Fig. 4 with each spider connected to the one therebelow through a pair of dowel pins.

It should be noted that when two or more indexing control spiders 121 are employed they may each differ from the other in the number and spacing of their indexing trip pins 125, wherefore the machine may be adapted to take, in succession, work pieces on which operations are to be performed at different angular positions or spacing. In this instance it is only necessary to adjust the position of the switch 91 axially of the stem or rod 115 so as to align it with the desired indexing control spider 121.

Figure 7:
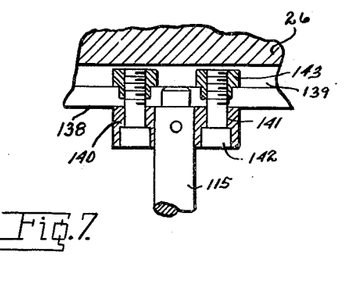
Fig. 7 is an enlarged fragmentary sectional view through the mounting means for the control switches as seen from line 7—7 on Fig. 4.
Figure 8:
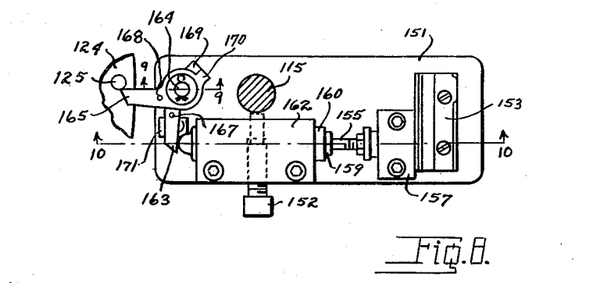
Fig. 8 is a plan view of one of the control switches on an enlarged scale as seen from line 8—8 on Fig. 4.
Figure 9:
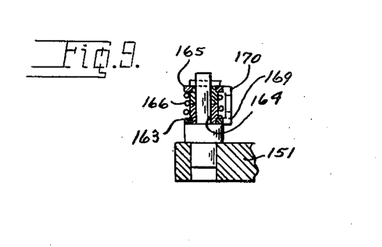
Fig. 9 is a fragmentary sectional view through a part of Fig. 8 as seen from line 9—9 on said Fig. 8.
Figure 10:
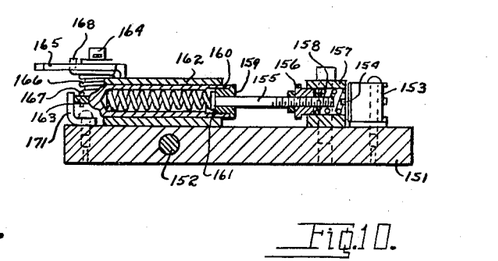
Fig. 10 is a longitudinal sectional view through the control switch of Fig. 8 as seen from line 10—10 on said Fig. 8.

Any suitable or desirable means may be employed for positioning and securing the stem or rod 115 to the table support 26, that shown in the drawings comprising providing the said table support 126 with a depending rib 138 in which is formed a T-slot 139 and securing to the rod or stem 115 near its upper end a mounting block 140. As shown in Fig. 7 the block 140 is provided with an aperture 141 on each side of the stem or rod 115 through each of which projects a screw 142 receiving on its inner threaded end a T-nut 143 disposed in the T-slot 139. By this construction the stem or rod 115 may be positioned anywhere around the table that may be convenient for adjustment and maintenance purposes.

In operation, the parts are so located with respect to one another that the index pins 125 successively engage the plunger roller 111 for depressing same and through the plunger head 103 actuating switch button 102 and opening the "Micro" switch 101.

Referring again to the wiring diagram in Fig. 17 the opening of the slow down switch 91 interrupts the current flow in the line or wire 90 for deenergizing the coils of solenoid switches CS and F. The deenergization of these solenoid switch coils allows their switches to assume normal positions and thereby close normally closed solenoid switch contacts F–1 and close normally closed solenoid switch contacts C–2 for thereby completing a circuit from line 80 and one side of the direct current source through the wire or line 98 including starting and slow speed resistance 144, normally open now closed solenoid switch contacts SD–4, normally closed now closed solenoid switch contacts F–1, slow down and dynamic braking resistance 99, normally closed now closed solenoid switch contacts CS–2, motor series field 84 and reverse voltage resistance 85 to the wire or line 81 and the other side of the direct current source. By this construction the motor will dynamically brake until the counter-voltage is equal to the voltage drop across the braking resistance 99 causing the table to continue to slowly rotate in a forward direction until a second limit switch, the locating limit switch, 145, normally open, is closed.

The locating limit switch 145 is shown diagrammatically in Fig. 17 in the line or wire 146 which extends between direct current circuit primary lines or wires 80 and 81. The line or wire 146, in addition, includes normally open solenoid switch contacts CS–5 and solenoid switch coil CR1. Shunted around the normally open solenoid switch contacts CS–5 is a shunt line 147 having therein normally open solenoid switch contacts CR1–1. Extending from a point in the line or wire 146 intermediate the locating limit switch 145 and the normally open solenoid switch contacts CS–5 to the line or wire 81, is a line or wire 148 which, behind the locating switch 145, includes normally closed now closed solenoid switch contacts CS–4, normally closed now closed solenoid switch contacts CR1–2, normally closed now closed solenoid switch contacts F–2, normally open now closed solenoid switch contacts CR3–2 together with solenoid switch coil CR2. Extending from the line or wire 82 from a point between the normally open solenoid contacts F3 and the motor armature contact A–1 to the wire or line 81 is a wire or line 149 having therein normally open solenoid switch contacts CR2–2.

The closing of the normally open limit or locating switch 145 completed a circuit from line 80 and one side of the direct current source through wires or lines 146 and 148 through normally closed now closed solenoid switch contacts CS–4, normally closed now closed solenoid switch contacts CR1–2, normally closed now closed solenoid switch contacts F–2, normally open now closed solenoid switch contacts CR3–2 and coil of solenoid switch CR2 to line 81 and the other side of the direct current source for energizing the coil of the said solenoid switch CR2. This energization of the solenoid switch CR2 closed normally open solenoid switch contacts CR2–2 for closing or completing the circuit in the line or wire 149. The energization of the solenoid switch CR2 also opened normally closed solenoid switch contacts CR2–1 thereby releasing or deenergizing the coil of solenoid switch SD. The energization of the solenoid switch CR2 also closed normally open solenoid switch contacts CR2–3 which will maintain energized the coil of the solenoid switch CR3 when the solenoid switch contacts SD–2 open upon deenergization of the coil of solenoid switch SD.

Extending from line or wire 98 at a point between the starting and slow speed resistance 144 and solenoid switch normally open now open contacts SD–4 is a wire or line 150 that extends to the wire or line 82 to a point therein intermediate the motor series field 84 and the motor armature contact A–2 with said line or wire 150 containing normally closed now closed solenoid switch contacts SD–3, normally open now closed solenoid switch contacts CR3–1 and normally closed now closed solenoid switch contacts CS–3.

There is now a divided voltage or current flow circuit set up wherein the current flow is from line 80 and one side of the direct current source through the starting and slow speed resistance 144, normally closed now closed solenoid switch contacts SD–3, normally open now closed solenoid switch contacts CR3–1 and normally closed now closed solenoid switch contacts CS–3 to the line 82 at which point part of the current flows through the motor series field 84 and reverse voltage resistance 85 to line 81 while the remainder of the current flow is to motor armature contact A–2 reversely through said armature to its contact A–1 and the normally open now closed solenoid switch contacts CR2–2 to said line 81 and the other side of the direct current flow. This causes a reverse rotation of the motor armature 83 and, therefore, table motor 72 and the table 27 until the final locating point is reached whereupon the table is clamped in its finally located position.

The locating limit switch 145 is shown structurally in Figs. 4, 5, 8, 9 and 10 and is somewhat similar to the slow down or anticipating limit switch 91. The said locating limit switch is indicated in its entirety by the reference numeral 145 and specifically comprises a base block 151 having an aperture therein for mounting same on the stem or rod 115 adjacent to the slow down switch 91. The base block 151 is secured in position by a clamp screw 152 impinging on the said rod or stem 115. Disposed on the base block 151 is the switch, per se, 153 which is a "Micro" switch similar to the switch, per se, 101 above identified except that the switch 152 is of the normally open type wherefore the circuit therethrough is normally broken. Projecting from the switch 153 is a button 154 adapted to be contacted by end of a plunger rod 155 which carries at its said one end a guide sleeve 156 axially movable through a guide block 157 secured to the base block 151 by suitable screws or the like. The plunger rod 155 is maintained out of contact with the button 154 by a spring 158 disposed in the bore in the guide block 157 with said spring having its opposite ends in abutment with the switch 153 and plunger guide sleeve 156.

The plunger rod 155 has its other end disposed in a guide bushing 159 carried by the inner end of a plunger sleeve 160 with said parts being prevented from disassociation by a radial flange 161 on the end of the plunger rod 155 and disposed interiorly of the sleeve 160. The plunger sleeve 160 is axially movable through a guide block 162 secured in any suitable or desirable manner to the base block 151 preferably adjacent its other end. The outer end of the plunger sleeve 160 is closed and contacts a finger 163 of the plunger actuating mechanism. The finger 163 is rotatable about a bushing and pin assembly 164, see Fig. 9, upstanding from the base block 151 adjacent its inner end. Rotatably mounted on said pivot bushing and pin assembly 164 is a second finger 165 that projects at right angles to the finger 163 and outwardly of the base block 151. The said fingers 163 and 165 are yieldably actuated in opposite directions by a spring 166 having its one end anchored or secured to the finger 163 as at 167 and having its other end anchored or secured to the finger 165 as at 168, all as clearly illustrated in Fig. 10. The said spring 166 tends to rotate the fingers 163 and 165 in opposite directions with said fingers each having a depending abutment or tail 169 and 170 which limit their independent movement by the said spring 166. The fingers are maintained in the positions illustrated in the drawings by the spring 158 retaining the plunger assembly in its normal position with the plunger sleeve 160 holding the finger 163 against a fixed abutment 171 upstanding from the base block 151. The finger 165 is normally maintained in position to be engaged by the index control mechanism locating pins 125. The relationship of the parts is such, see Fig. 5, that shortly after the indexing locating pin has actuated the slow down switch upon engagement with the slow down or anticipating switch actuator or roller 111 it engages the finger 165 for effecting the operation of the table driving motor 72 as above set forth.

Reiterating the cycle of operation of the table motor as effected by the slow down switch 91 and the locating switch 105 it is as follows:

The motor is rotated at a rapid rate of speed in a forward direction toward the next index station until the index control mechanism pin 125 engages the actuator or roller 111 of the slow down switch for actuating same, whereupon, a dynamic brake is applied to the motor for reducing its speed anticipatory to stopping same. The said index control mechanism pin 125 immediately picks up the locating switch actuator or finger 165 for actuating the switch 145. The closing of the switch 145 effects a reverse flow of current through the motor causing same to back up the table to the exact point. This operation is effected by backing the indexing control mechanism pin 125 from the switch finger 165 until the said switch is open for thereby deenergizing the motor entirely as will now be made clear.

This action is clearly illustrated in Fig. 18 wherein the index control mechanism pin 125 is illustrated as having actuated the slow down switch and passed the roller 111 and engaged the switch finger 165 and actuated it to the position for opening switch 153. The table motor reversed its direction of rotation and backed the control mechanism pin away from the switch finger 165 until said switch finger is in the position illustrated in dotted lines in Fig. 18 whereupon the table motor 72 is stopped.

The opening of the locating switch 145 opens the circuit in the wire or line 146 deenergizing the coil of solenoid switch CR2 for thereby breaking the circuit that permitted reverse flow through the motor armature 83 by opening normally open solenoid switch contacts CR2–2. Simultaneously the circuit in wires or lines 97 and 95 is broken by the opening of solenoid switch contacts CR2–3 in line or wire 97 for thereby deenergizing the coil of solenoid switch CR–3 in the line or wire 95. The deenergization of the solenoid switch CR3 opened normally open solenoid switch contacts CR3–4 and CR3–5 in line or wire 172 which extends between wires or lines 80 and 81 and which wire or line 172 includes the solenoid coil 173 of a table locking mechanism now to be described.

Figure 12:
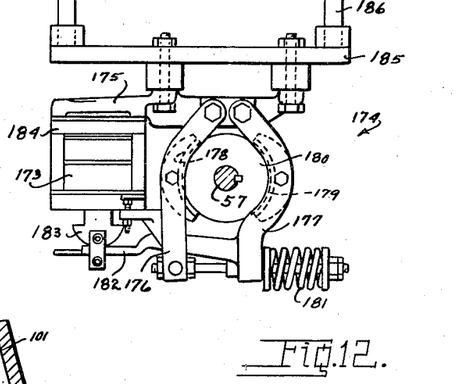
Fig. 12 is a view partly in plan and partly in section of a brake or stop mechanism for locking the table drive between indexes as seen from line 12—12 on Fig. 3.

The table locking mechanism is illustrated structurally in Figs. 3 and 12 and is indicated in its entirety by the numeral 174 and is of a well known construction. Briefly the table locking mechanism comprises a base 175 having pivotally mounted thereon a pair of arms 176 and 177 respectively carrying clamp shoes 178 and 179 adapted to engage the periphery of a drum 180 keyed or otherwise secured to the table driving shaft 57. The arms 176 and 177 are yieldably held in clamping position by a spring 181 which actuates the outer ends thereof toward one another for clampingly gripping the drum 180 between their shoes 178 and 179. A release mechanism, operative to actuate the arms 176 and 177 against the spring clamping tension of the spring 181, is provided and may consist of a lever 182 operatively connected with the movable core 183 of the solenoid 184 that includes and is energized by the coil 173.

Any suitable or desirable means may be employed for mounting the locking mechanism in operative position, that shown in the drawings comprising a mounting plate 185 having projecting therefrom mounting bolts 186 that extend from the bed wall 36.

It should be noted that substantially immediately upon the starting of a cycle of indexing by closing the start switch 89 and by energization of the coil of solenoid switch CR3 the normally open solenoid contacts CR3–4 and CR3–5 were closed for actuating the solenoid 184 and thereby releasing the brake mechanism 174.

The table is now locked in its operative position to have performed on the work the desired operation such as the drilling of an aperture 34 by the drill 32. After the said operation has been completed an indexing cycle is initiated by the closing of the starting switch 89.

It will be understood that the various solenoid switches above referred to are of the well known type and each includes a movable member on which is mounted a contact to engage a fixed contact for thereby completing its electrical circuit and that the said solenoid switches are carried by the panel, or cabinet, 35 generally mounted exteriorly of the bed.

The cam feed drill unit 31 is well known and is illustrated and described in detail in United States Patent 2,367,953 to George K. McKee and George E. Ecimpidis which issued on January 16, 1945. It is deemed unnecessary to illustrate and describe in minute detail the said cam feed unit but the essential features have been illustrated.

Briefly the cam feed unit, as illustrated in the drawings, comprises a housing 188 having mounted on its upper surface a plate 189 to which is secured a motor 190 driving through a pulley 191 and belt 192 the pulley 193 keyed or otherwise secured to a sleeve 194. The sleeve 194 is provided exteriorly with a worm 195 and is internally splined at 196 to the rear end of the drill spindle 197.

The spindle 197 is adapted to be axially moved to effect a drilling operation for which purpose it is rotatably mounted in a quill 198 disposed for axial movement in a bearing 199 integral with the housing 188.

The axial movement of the drill spindle 197 and quill 198 is effected by an oscillatable arm 200 pivotally mounted within the housing 188 at 201. Projecting from the upper end of the arm 200 is a roller carried by the stud 202 with said roller disposed in a vertical guide track formed between blocks 203 on the quill 198. Intermediate the pivotal mounting 201 and stud 202, the arm 200 is provided with a cam follower roller 204 disposed, see Fig. 15, in the face cam track or slot 205 in one side or face of cam 206. The cam 206 has secured to its other side or face a gear 207 meshing with a pinion 208 pinned or otherwise secured to the drive shaft 209. The drive shaft 209 has freely mounted thereon a worm wheel 210 immeshed with the driving worm 195 of driving sleeve 194. Secured to and projecting from the worm wheel 210 is clutch part 211 adapted to be in clutch engagement with clutch part 212 splined on the drive shaft 209. Disposed between the clutch parts 211 and 212 is a spring 213 tending to separate the said clutch parts 211 and 212.

The clutch parts 211 and 212 are adapted to be held in driving engagement against the resistance of spring 213 by a solenoid 214 which includes a coil 215. The solenoid 214 has its movable core 216 furcated and connected with one end of a bell crank 217 oscillatable about a pivot bolt 218. The other arm or end of the bell crank 217 is connected with a plunger 219 pivotally secured at its other end to one arm of a bell crank 220 mounted for oscillation on an upstanding pivot 221. The other arm or end of the bell crank 220 is forked as at 222 and straddles the driving shaft 209 to be in engagement with an antithrust bearing 223 for forcing the driving clutch parts 211 and 212 into driving engagement with one another.

Figure 13:
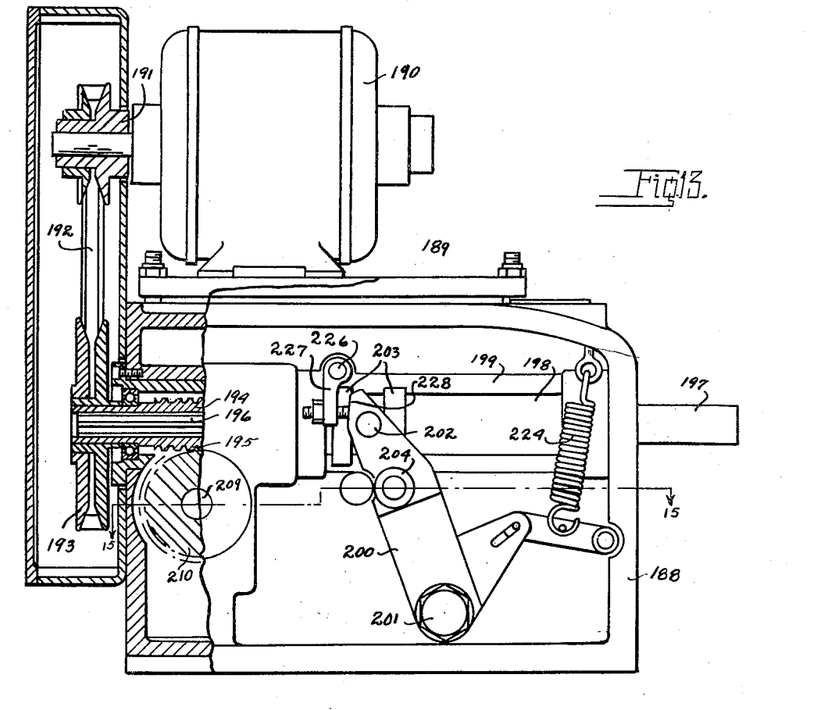
Fig. 13 is an enlarged view partly in section and partly in elevation of a tooling unit, a drilling unit, as seen from line 13—13 on Fig. 1.
Figure 14:
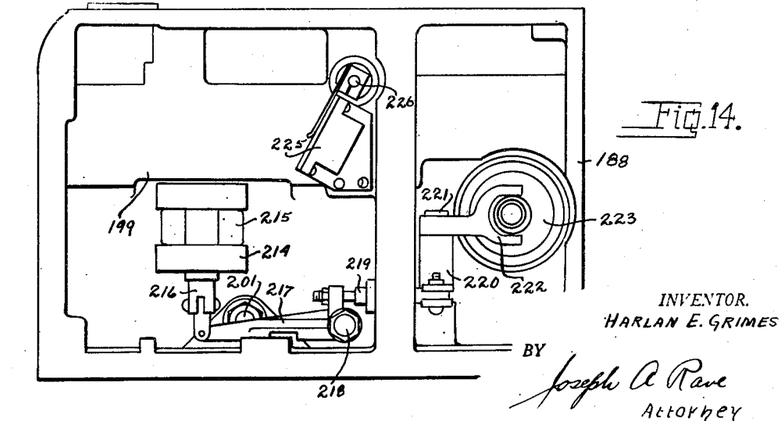
Fig. 14 is a further view of the drilling unit on an enlarged scale and as seen from line 14—14 on Fig. 1.
Figure 15:
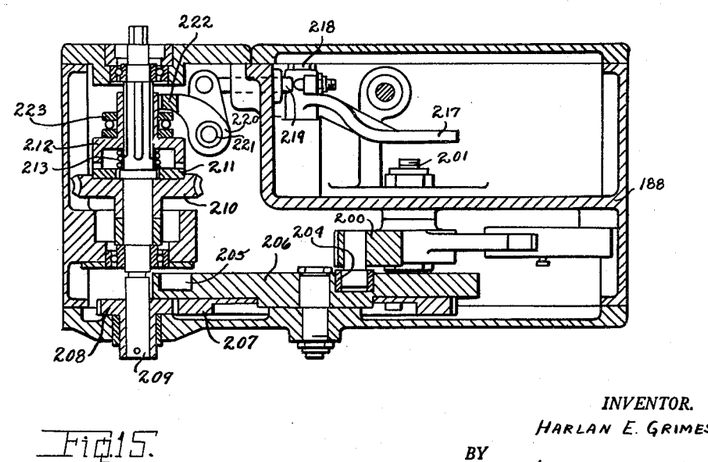
Fig. 15 is a horizontal sectional view through the drilling unit as seen from line 15—15 on Fig. 13.

It is believed that the operation of the cam feed unit is obvious from the disclosure in Figs. 13, 14 and 15 of the drawings when coupled with the above brief description of its operation, and it will be understood that energization of the solenoid 214 will cause the clutch parts 211 and 212 to be engaged with one another whereupon the worm wheel 210, in driving engagement with the worm 195, will immediately rotate the drive shaft 209 which through the pinion 208 and gear 207 will rotate the cam 206. The cam 206 through its cam track 205 will oscillate the arm 200 for axially advancing and retracting the spindle 197 and drill 32 carried thereby. As illustrated in Fig. 13 a spring 224 is provided to maintain a yieldable bias on the arm 200 for removing backlash and play in the parts.

Carried by the housing 188 interiorly thereof is a control switch 225 which is mounted at one end of an oscillatable rod 226. The rod 226 has secured to its other end a depending arm 227 adapted to be engaged by a cam face 228 at the upper end of the spindle actuating arm 200.

Figure 16:
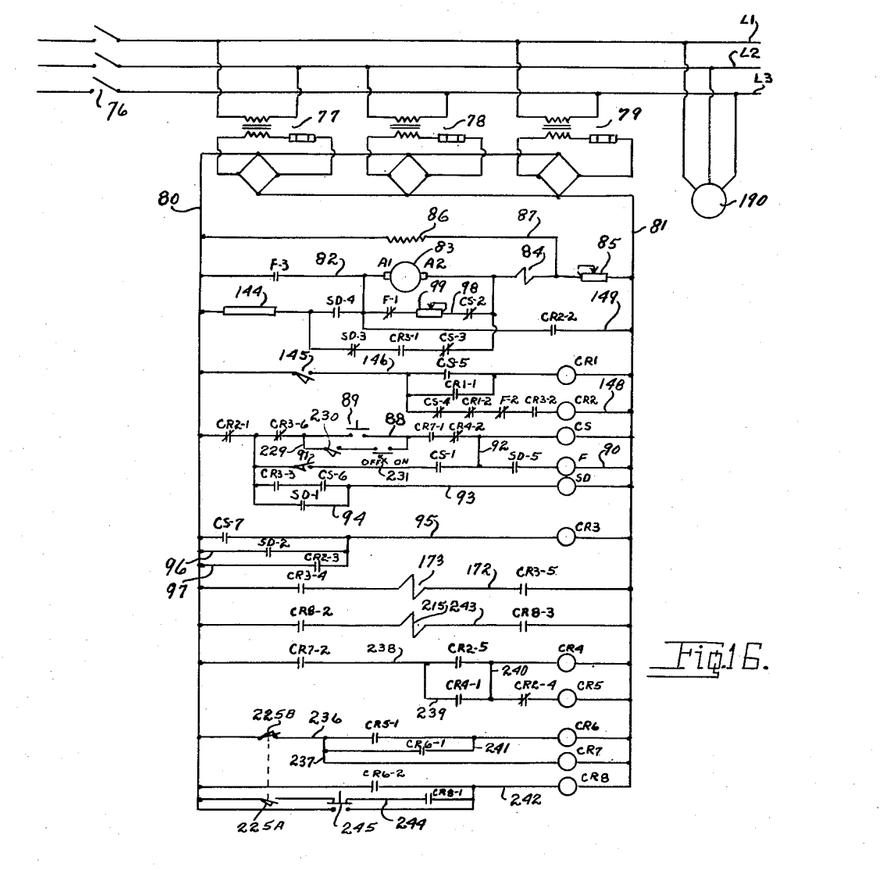
Fig. 16 is a wiring diagram illustrating the complete electrical circuit for indexing the indexable part and a tooling or drilling unit for effecting an automatic cyclic operation of the machine.

The switch 225 has two portions which are sequentially operated with substantially no time loss between their operations and are designated in the wiring diagram in Fig. 16 by the reference numerals 225A and 225B with said switch operating to automatically initiate an indexing cycle after the spindle has been retracted, as will presently be made clear.

Fig. 16 is a wiring diagram identical with Fig. 17 with the added electrical equipment to tie in and operate the cam feed drilling unit with the table indexing unit for effecting alternately automatic indexing and automatic tooling.

In order to tie in the indexing table circuit and control mechanism with the automatic tool head and operate the table at the conclusion of each tooling operation wire or line 88 must be modified to the extent of shunting the start switch 89 with a wire or line 229 in which is a normally closed limit switch 230 as well as a selectively operable on and off switch 231. The on and off switch 231 is utilized for disconnecting the circuits of the table indexing mechanism and the tool head mechanism from one another should for some reason it be desired to operate these circuits independently. The limit switch 230 is for interrupting the circuits at the completion of a complete work cycle as when it is necessary to change work pieces.

The switch illustrated in Figs. 1 and 2 includes the switch, per se, 232 having projecting therefrom a depressible button 234 which is engageable by and depressed through a cam 235 projecting from the rim of the table 27. It is for this purpose that the table 27 is provided with a groove so that the cam 235 may be mounted in the desired position for interrupting the circuit by opening the switch 232.

In addition the line or wire 88 of Fig. 17 is disclosed in Fig. 16 as including normally open solenoid switch contacts CR7–1 and normally closed solenoid switch contacts CR4–2.

The wiring diagram in Fig. 16 in addition to the disclosure in Fig. 17 includes a line or wire 236 in which is the limit switch portion 225B, normally open solenoid switch contacts CR5–1 and coil of solenoid switch CR6. Extending from the line or wire 236 from a point between limit switch 225B and normaly open solenoid contacts CR5–1 is a line or wire 237 that terminates in the line or wire 81 and includes the coil of solenoid switch CR7. The circuit thus set up, upon the retraction of the spindle 197 and drill 32, includes line or wire 80 from one side of the direct current source through the switch 225B, lines 236 and 237 and solenoid switch coil CR7 to the line 81 and other side of the direct current source sets up the circuit to operate the cam feed drilling unit upon the completion of the indexing movement. Energization of the solenoid switch CR7 closes normaly open solenoid switch contacts CR7–2 in a wire or line 238 which extends from line or wire 80 and one side of the direct current source to the wire or line 81 and other side of the direct current source includes normally open solenoid switch contacts CR2–5 and coil of solenoid switch CR4. Extending from the line or wire 238 from a point intermediate normally open solenoid switch contacts CR7–2 and normally open solenoid switch contacts CR2–5 is a line or wire 239 which terminates in the line or wire 81 and with said line or wire 239 including normally open solenoid switch contacts CR4–1, normally closed solenoid switch contacts CR2–4 and coil of solenoid switch CR5. The wires or lines 238 and 239 are bridged by a wire 240 between a point on wire 238 intermediate normally open solenoid switch contacts CR2–5 and solenoid switch coil CR4 and a point on wire 239 intermediate normally open solenoid switch contacts CR4–1 and normally closed solenoid switch contacts CR2–4.

With the drill head spindle in its retracted position during the table indexing operation the limit switch portion 225B is closed completing an electric circuit for energization of solenoid switch CR7. The energization of the solenoid switch CR7 closes solenoid switch normally open contacts CR7–2 in line or wire 238 preparatory to a tooling cycle. Upon energization of the solenoid switch coil CR2 the normally open solenoid switch contacts CR2–5 were closed for completing the electrical circuit in the line or wire 238 and energizing solenoid switch CR4. Solenoid switch CR4 upon energization closed normally open solenoid contacts CR4–1 in line 239 for completing a circuit through said line 239 and strap 240 around the solenoid switch contacts CR2–5 and thereby set up a holding circuit for solenoid switch CR4. The deenergization of the solenoid switch CR2 permitted closing of the normally closed solenoid switch contacts CR2–4 thereby completing an electric circuit from line 80 and one side of the direct current source through solenoid switch normally open now closed contacts CR7–2 in line 238 and normally open now closed solenoid switch contacts CR4–1 and normally closed now closed solenoid switch contacts CR2–4 in line 239 for energizing solenoid switch CR5 to the line 81 and other side of the direct current source.

The energization of solenoid switch CR5 closed normally open solenoid switch contacts CR5–1 for thereby completing the circuit in line 236 and normally open now closed limit switch portion 225B for energizing the solenoid switch CR6. Strapped around normally open solenoid switch contacts CR5–1 is a line or wire 241 having therein normally open solenoid switch contacts CR6–1 which are now closed and establish a holding circuit for the solenoid switch CR6.

Extending across the circuit primary or feed wires or lines 80 and 81 is a line or wire 242 having therein the normally open solenoid switch contacts CR6–2 which are closed upon energization of the solenoid switch CR6 for completing the circuit in wire or line 242 and energizing the coil of solenoid switch CR8.

The energization of the solenoid switch CR8 closed solenoid switch normally open contacts CR8–2 and solenoid switch normally open contacts CR8–3 in wire or line 243 which extends between the wire or lines 80 and 81 and which includes the coil 215 of the drill head driving clutch actuating solenoid 214.

The limit switch portion 225A is in a line or wire 244 which extends from the wire or line 80 to a point in wire or line 242 located intermediate normally open solenoid switch contacts CR6–2 and the coil of solenoid switch CR8 with said wire or line 244 including normally open solenoid switch contacts CR8–1 and the normally closed contacts of a jogging switch 245. The energization of the solenoid switch CR8 closed the normally open solenoid switch contacts CR8–1 so that upon closing of the limit switch portion 225A a holding circuit for the solenoid switch CR8 is effected for maintaining the clutch solenoid energized during the operation of the tool unit.

After completion of the tooling operation and upon retraction of the tool the limit switch portion 225A is opened and the limit switch portion 225B is closed. The opening of the limit switch 225A interrupted the circuit to solenoid switch CR8 thereby opening solenoid switch contacts CR8–2 and CR8–3 for deenergizing the solenoid coil 215 and the solenoid 214 to permit the separation of the driving clutch in the tool head and a cessation of operation thereof. The closing of the limit switch portion 225B effected the energization of the solenoid switch CR7 which closed the normally open solenoid switch contacts CR7–1 in line or wire 88 thereby completing an electric circuit from the line or wire 80 and one side of the direct current source through normally closed now closed solenoid switch contacts CR2–1, normally closed now closed solenoid switch contacts CR3–6, cycle limit switch 230, circuits connecting and disconnecting switch 231, normally open now closed solenoid contacts CR7–1, normally closed now closed solenoid switch contacts CR4–2 and the coil of solenoid switch CS to line or wire 81 and the other side of the direct current switch. The energization of the solenoid switch CS initiated an indexing cycle as above set forth.

From the foregoing it will be noted that there has been provided an indexing mechanism for a work supporting table and which indexing mechanism may be interconnected with an automatically operated tool head with said parts operable in sequential order.

The mechanism is illustrated in the drawings as applied to a rotatable work supporting table but it is readily understood that the control mechanism may be incorporated with the table driving mechanism of machines in which the work supporting table is given a purely straight line movement adapted to have its movement interrupted at various points along its path of travel. It will further be noted that the mechanism is extremely simple for accomplishing its purpose.

What is claimed is:

1. In a machine tool organization the combination of a support, a work table rotatably mounted on said support indexable successively to a plurality of index positions in a forward direction, a direct current electric motor connected with the table and operable at fast and slow speeds in said forward direction and in a reverse direction for correspondingly rotating the table, an interruptable control circuit for the motor through which the motor and table are rotated at a fast rate between index positions, means in said control circuit operable for each index position for reducing the speed of the motor and the rate of rotation of the table in said forward direction, means in said control circuit operable for each said index position for reversing the direction of rotation of the motor and table, a first switch in said control circuit operable for each index position operating the motor speed reducing means, a second switch in said control circuit operable for each index position operating the motor reversing means and interrupting the circuit, means carried by the work table and movable therewith operable for each indexable position for sequentially operating said first and second switches, means carried by the support for mounting the switches in positions for operation of the first switch by the work table switch operating means just before the table reaches an index position and thereafter operation of the second switch by said table switch operating means for sequentially reducing the speed of the motor just before the table reaches each indexable position, reversing the direction of rotation of the motor, and interrupting the control circuit for stopping the motor at the said each indexable position, a tool head on said support adjacent the rotatable work supporting table, a retractable tool carried by the tool head, means carried by the tool head for effecting the operation of the retractable tool, electro-magnetic means for controlling the operation of the retractable tool operating means, and means in said circuit operable by said second switch for energizing the electro-magnetic means.

2. In a machine tool organization the combination of a support, a work table rotatably mounted on said support indexable successively to a plurality of index positions in a forward direction, a direct current electric motor connected with the table and operable at fast and slow speeds in said forward direction and in a reverse direction for correspondingly rotating the table, an interruptable control circuit for the motor through which the motor and table are rotated at a fast rate between index positions, means in said control circuit operable for each index position for reducing the speed of the motor and the rate of rotation of the table in said forward direction, means in said control circuit operable for each said index position for reversing the direction of rotation of the motor and table, a first switch in said control circuit operable for each index position operating the motor speed reducing means, a second switch in said control circuit operable for each index position operating the motor reversing means and interrupting the circuit, means carried by the work table and movable therewith operable for each indexable position for sequentially operating said first and second switches, means carried by the support for mounting the switches in positions for operation of the first switch by the work table switch operating means just before the table reaches an index position and thereafter operation of the second switch by said table switch operating means for sequentially reducing the speed of the motor just before the table reaches each indexable position, reversing the direction of rotation of the motor, and interrupting the control circuit for stopping the motor at the said each indexable position, a tool head on said support adjacent the rotatable work supporting table, a retractable tool carried by the tool head, means carried by the tool head for effecting the operation of the retractable tool, electro-magnetic means for controlling the operation of the retractable tool operating means, means in said circuit operable by said second switch for energizing the electro-magnetic means, and means operable upon the retraction of the tool for completing the motor circuit to effect operation thereof and the table.

3. In a machine tool organization the combination of a support, a work table mounted on said support for movement relative thereto successively to a plurality of indexable positions in a forward direction, a direct current electric motor connected with the table and operable at fast and slow speeds in said forward direction and in a reverse direction for correspondingly moving the table, an interruptable control circuit for the motor through which the motor and table are moved at a fast rate between index positions, a slow speed and dynamic brake resistance in the circuit connectable with the motor for causing same to rotate in a forward direction at a slow speed and correspondingly move the table, a reverse voltage resistance in said circuit connectable with the motor for effecting the reverse rotation of the motor and correspondingly move the table, a first switch in said circuit operable for connecting the slow speed and dynamic brake resistance with the motor, a second switch in said circuit operable for connecting the reverse voltage resistance with the motor, and means carried by the work table movable therewith and operable just before the table reaches an indexable position for operating the first switch for slowing down the speed of the motor and the table and then actuating said second switch for reversing the motor and the table and returning the table to its indexable position and interrupting the control circuit.

4. In a machine tool organization the combination of a support, a work table mounted on said support for movement relative thereto successively to a plurality of indexable positions in a forward direction, a direct current electric motor connected with the table and operable at fast and slow speeds in said forward direction and in a reverse direction for correspondingly moving the table, an interruptable control circuit for the motor through which the motor and table are moved at a fast rate between index positions, a slow speed and dynamic brake resistance in the circuit connectable with the motor for causing same to rotate in a forward direction at a slow speed and correspondingly move the table, a reverse voltage resistance in said circuit connectable with the motor for effecting the reverse rotation of the motor and correspondingly move the table, a first switch in said circuit operable for connecting the slow speed and dynamic brake resistance with the motor, a second switch in said circuit operable for connecting the reverse voltage resistance with the motor, and means carried by the work table movable therewith and operable just before the table reaches an indexable position for operating the first switch for slowing down the speed of the motor and the table and then actuating said second switch for reversing the motor and the table and returning the table to its indexable position and interrupting the circuit, said first switch being a normally closed switch rendering the slow speed and dynamic brake resistance normally inoperative, and the index control means being in the form of a pin for momentarily operating said normally closed switch to render operative the dynamic brake resistance.

5. In a machine tool organization the combination of a support, a work table mounted on said support for movement relative thereto successively to a plurality of indexable positions in a forward direction, a direct current electric motor connected with the table and operable at fast and slow speeds in said forward direction and in a reverse direction for correspondingly moving the table, an interruptable control circuit for the motor through which the motor and table are moved at a fast rate between index positions, a slow speed and dynamic brake resistance in the circuit connectable with the motor for causing same to rotate in a forward direction at a slow speed and correspondingly move the table, a reverse voltage resistance in said circuit connectable with the motor for effecting the reverse rotation of the motor and correspondingly move the table, a first switch in said circuit operable for connecting the slow speed and dynamic brake resistance with the motor, a second switch in said circuit operable for connecting the reverse voltage resistance with the motor, and means carried by the work table movable therewith and operable just before the table reaches an indexable position for operating the first switch for slowing down the speed of the motor and the table and then actuating said second switch for reversing the motor and the table and returning the table to its indexable position and interrupting the circuit, said first and second switches being, respectively, a normally closed limit switch and a normally open limit switch, and said index control means being in the form of a pin for momentarily opening said normally closed limit switch for rendering operative the dynamic brake resistance, and for closing said normally open limit switch for connecting with the motor the reverse voltage resistance for reversing the rotation of the motor and the direction of movement of the work table to its indexable position and interrupting the control circuit.

6. In a machine tool organization the combination of a support, a work table mounted on said support for movement relative thereto successively to a plurality of indexable positions in a forward direction, a direct current electric motor including an armature in constant driving connection with the table and operable at fast and slow speeds in a forward direction and in a reverse direction for correspondingly moving the table, an interruptable control circuit for the motor through which the motor and table are moved at a fast rate between index positions, a slow speed resistance in said circuit normally inoperative but connectable therein with the motor armature for effecting its rotation and the movement of the table in a forward direction at a sloow speed, a dynamic brake resistance in said circuit normally inoperative connectable with the motor armature for stopping its rotation and the table movement, a reverse voltage resistance in said circuit for reversing the current flow through the armature and effecting a reverse rotation thereof and a reverse movement of the table, means operable by the table for connecting the slow speed resistance and the dynamic brake resistance with the armature just before the table reaches an indexable position, and sequentially thereafter connecting the reverse voltage resistance with the armature, and interrupting the control circuit for stopping the motor at each indexable position, and a switch for completing the control circuit and initiating the rotation of the motor.

7. In a machine tool organization the combination of a support, a work table mounted on said support for movement relative thereto successively to a plurality of indexable positions in a forward direction, a direct current electric motor including an armature in constant driving connection with the table and operable at fast and slow speeds in a forward direction and in a reverse direction for correspondingly moving the table, an interruptable control circuit for the motor through which the motor and table are moved at a fast rate between index positions, a slow speed resistance in said circuit normally inoperative but connectable therein with the motor armature for effecting its rotation and the movement of the table in a forward direction at a slow speed, a dynamic brake resistance in said circuit normally inoperative connectable with the motor armature for stopping its rotation and the table movement, a reverse voltage resistance in said circuit for reversing the current flow through the armature and effecting a reverse rotation thereof and a reverse movement of the table, means operable by the table for connecting the slow speed resistance and the dynamic brake resistance with the armature just before the table reaches an indexable position, and sequentially thereafter connecting the reverse voltage resistance with the armature, and interrupting the control circuit for stopping the motor at each indexable position, a switch for completing the control circuit and initiating the rotation of the motor, and means carried by the work table support for actuating the switch.

8. In a machine tool organization the combination of a support, a work table mounted on said support for movement relative thereto successively to a plurality of indexable positions in a forward direction, a direct current electric motor connected with the table and operable at fast and slow speeds in said forward direction and in a reverse direction for correspondingly moving the table, an interruptable control circuit for the motor through which the motor and table are moved at a fast rate between index positions, a slow speed and dynamic brake resistance in the circuit connectable with the motor for causing same to rotate in a forward direction at a slow speed and correspondingly move the table, a reverse voltage resistance in said circuit connectable with the motor for effecting the reverse rotation of the motor and correspondingly move the table, a first switch in said circuit operable for connecting the slow speed and dynamic brake resistance with the motor, a second switch in said circuit operable for connecting the reverse voltage resistance with the motor, means carried by the work table movable therewith and operable just before the table reaches an indexable position for operating the first switch for slowing down the speed of the motor and the table and then actuating said second switch for reversing the motor and the table and returning the table to its indexable position and interrupting the control circuit, and means automatically locking the table in each of its index positions.

9. In a machine tool organization the combination of a support, a work table mounted on said support for movement relative thereto successively to a plurality of indexable positions in a forward direction, a direct current electric motor connected with the table and operable at fast and slow speeds in said forward direction and in a reverse direction for correspondingly moving the table, an interruptable control circuit for the motor through which the motor and table are moved at a fast rate between index positions, a slow speed and dynamic brake resistance in the circuit connectable with the motor for causing same to rotate in a forward direction at a slow speed and correspondingly move the table, a reverse voltage resistance in said circuit connectable with the motor for effecting the reverse rotation of the motor and correspondingly move the table, a first switch in said circuit operable for connecting the slow speed and dynamic brake resistance with the motor, a second switch in said circuit operable for connecting the reverse voltage resistance with the motor, means carried by the work table movable therewith and operable just before the table reaches an indexable position for operating the first switch for slowing down the speed of the motor and the table and then actuating said second switch for reversing the motor and the table and returning the table to its indexable position and interrupting the control circuit, electro-magnetically controlled means for locking the table in each of its index positions, and operating means in said control circuit for said electro-magnetically operated locking means operable upon interruption of the motor control circuit for automatically locking the table in said each of its index positions.

10. In a machine tool organization the combination of a support, a work table mounted on said support for movement relative thereto and indexable successively to a plurality of positions in a forward direction, a direct current electric motor connected with the table and operable at fast and slow speeds in a forward direction and in a reverse direction for correspondingly moving the table, a control circuit for said motor, switch means in said control circuit operable to start and effect the rotation of the motor at fast forward speed for moving the table at a fast rate in a forward direction, switch means in said control circuit operable for slowing down the rotation of the motor in a forward direction and correspondingly slowing down the rate of movement of the table in a forward direction, switch means in said control circuit operable for reversing the direction of rotation of the motor and the direction of movement of the table, and means carried by the table for actuating said motor slow down switch means just before each index position and thereafter actuating said motor reversing switch means.

11. In a machine tool organization the combination of a support, a work table mounted on said support for movement relative thereto and indexable successively to a plurality of positions in a forward direction, a direct current electric motor connected with the table and operable at fast and slow speeds in a forward direction and in a reverse direction for correspondingly moving the table, a control circuit for said motor, switch means in said control circuit operable to start and effect the rotation of the motor at fast forward speed for moving the table at a fast rate in a forward direction, switch means in said control circuit operable for slowing down the rotation of the motor in a forward direction and correspondingly slowing down the rate of movement of the table in a forward direction, switch means in said control circuit operable for reversing the direction of rotation of the motor and the direction of movement of the table, means carried by the table for actuating said motor slow down switch means just before each index position and thereafter actuating said motor reversing switch means, said motor reversing switch means being normally closed by yieldable means and opened for effecting the reverse rotation of the motor, said means that actuates the motor reversing switch means holding the said motor reversing switch means open during the reverse rotation of the motor and which switch is being yieldably closed during said reverse rotation of the motor, and means operable upon reclosing of said switch for stopping the rotation of the motor.

12. In a machine tool organization the combination of a support, a work table mounted on said support for movement relative thereto and indexable successively to a plurality of positions in a forward direction, a direct current electric motor connected with the table and operable at fast and slow speeds in a forward direction and in a reverse direction for correspondingly moving the table, a control circuit for said motor, switch means in said control circuit operable to start and effect the rotation of the motor at fast forward speed for moving the table at a fast rate in a forward direction, switch means in said control circuit operable for slowing down the rotation of the motor in a forward direction and correspondingly slowing down the rate of movement of the table in a forward direction, switch means in said control circuit operable for reversing the direction of rotation of the motor and the direction of movement of the table, means carried by the table for actuating said motor slow down switch means just before each index position and thereafter actuating said motor reversing switch means, said motor reversing switch means being normally closed by yieldable means and opened for effecting the reverse rotation of the motor, said means that actuates the motor reversing switch means holding the said motor reversing switch means open during the reverse rotation of the motor and which switch is being yieldably closed during said reverse rotation of the motor, means operable upon reclosing of said switch for stopping the rotation of the motor, and means operable upon reclosing of said normally closed motor reversing switch means for locking the table in its indexable position.

13. In a machine tool organization the combination of a support, a work table mounted on said support for movement relative thereto to an indexable position, means including a pin carried by and movable with the work table determining the indexable position of the work table, a direct current electric motor operable at fast and slow speeds in a forward direction and in a reverse direction carried by the support connected with the table for correspondingly actuating the work table, a control circuit for the motor actuating the same and the table at a fast speed in a forward direction, said control circuit including means normally inoperative for slowing down the rate of rotation of the motor and the rate of actuation of the table, means in said control circuit normally inoperative for dynamically braking the motor, means in said control circuit normally inoperative for reversing the direction of rotation of the motor and the direction of movement of the table, a first switch for rendering operative the motor slow down and dynamic brake means, a second switch for rendering operative the motor reverse means, and means carried by the support for mounting the switches in positions for operation of the first switch by the indexable position determining pin just before the table reaches the index position and thereafter operation of the second switch by the said indexable position determining pin.

14. In a machine tool organization the combination of a support, a work table mounted on said support for movement relative thereto to an indexable position, means including a pin carried by and movable with the work table determining the indexable position of the work table, a direct current electric motor operable at fast and slow speeds in a forward direction and in a reverse direction carried by the support connected with the table for correspondingly actuating the work table, a control circuit for the motor actuating the same and the table at a fast speed in a forward direction, said control circuit including means normally inoperative for slowing down the rate of rotation of the motor and the rate of actuation of the table, means in said control circuit normally inoperative for dynamically braking the motor, means in said control circuit normally inoperative for reversing the direction of rotation of the motor and the direction of movement of the table, a first switch for rendering operative the motor slow down and dynamic brake means, a second switch for rendering operative the motor reverse means, means carried by the support for mounting the switches in position for operation of the first switch by the indexable position determining pin just before the table reaches the index position and thereafter operation of the second switch by the said indexable position determining pin, comprising each of said switches including a housing, a yieldable plunger projecting from said housing operable by the indexable position pin, and a rod carried by the support on which the switch housings are mounted.

15. In a machine tool organization the combination of a support, a work table rotatably mounted on said support, said table being indexable to a plurality of positions, and means for indexing the table comprising a prime mover, means for starting the prime mover from each indexable station, and means for stopping said prime mover at each indexable station including a member connected to and depending from the table, a plurality of pins each representative of an indexable position of the table carried by said member, and means stationarily mounting the prime mover stopping means in the path of the indexable member pins for operation thereby.

16. In a machine tool organization the combination of a support, a work table rotatably mounted on said support, said table being indexable to a plurality of positions, and means for indexing the table comprising a prime mover, means for starting the prime mover from each indexable station, and means for stopping said prime mover at each indexable station including a member connected to and depending from the table, a plurality of pins each representative of an indexable position of the table carried by said member, means stationarily mounting the prime mover stopping means in the path of the indexable member pins for operation thereby, said prime mover being in the form of an electric motor, and said prime mover stopping means being in the form of a switch operable by the indexable positions determining pins.

17. In a machine tool organization the combination of a support, a work table mounted on said support for rotation relative thereto to a plurality of indexable positions, and means for actuating the table to successive indexable positions comprising a plurality of members carried by and depending from the work supporting table, each member including a plurality of pins each indicative of an indexable position, a prime mover connectable with the work table for effecting its rotation, and control means carried by the support selectively positionable with respect to the indexable position control members and pins for stopping the prime mover and the work table at successive indexable positions.

18. In a machine tool organization the combination of a support, a work table mounted on said support for rotation relative thereto to a plurality of indexable positions, and means for actuating the table to successive indexable positions comprising a plurality of members carried by and depending from the work supporting table, each member including a plurality of pins each indicative of an indexable position, a prime mover connectable with the work table for effecting its rotation, control means carried by the support selectively positionable with respect to the indexable position control members and pins for stopping the prime mover and the work table at successive indexable positions, and means for removably mounting said indexable positions control member on the table.

19. In a machine tool organization the combination of a support, a work table mounted on said support for rotation relative thereto to a plurality of indexable positions, means for actuating the table to successive indexable positions comprising a plurality of members carried by and depending from the work supporting table, each member including a plurality of pins each indicative of an indexable position, a prime mover connectable with the work table for effecting its rotation, and control means carried by the support selectively positionable with respect to the indexable position control members and pins for stopping the prime mover and the work table at successive indexable positions, and means for removably mounting said indexable positions control member on the table, including a hub substantially centrally of each indexable positions control member superimposed on one another, dowel pins connecting each indexable positions control member hub to its adjacent control member hub, and clamp means for securing the control members to the table.

References Cited in the file of this patent

UNITED STATES PATENTS

| | | |
|---|---|---|
| 2,114,284 | Barnes et al. | Apr. 19, 1938 |
| 2,389,668 | Johnson | Nov. 27, 1945 |
| 2,561,346 | De Vlieg et al. | July 24, 1951 |